W. J. GALLAGHER
TOY
Jan. 5, 1932. Re. 18,320
Original Filed May 1, 1929
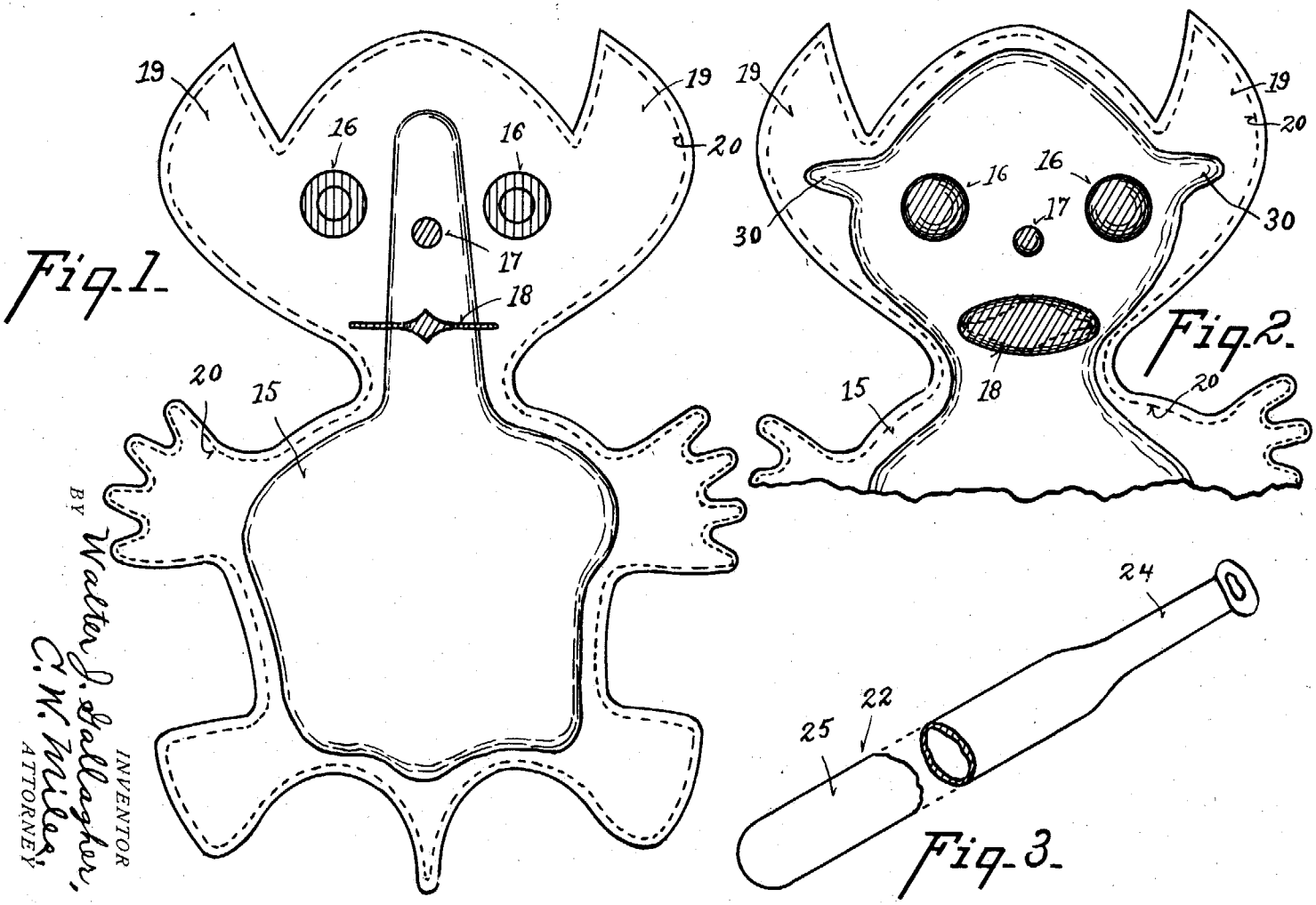
INVENTOR
BY Walter J. Gallagher,
C. W. Miles,
ATTORNEY Reissued Jan. 5, 1932

Re. 18,320

UNITED STATES PATENT OFFICE

WALTER J. GALLAGHER, OF CINCINNATI, OHIO

TOY

Original No. 1,806,053, dated May 19, 1931, Serial No. 359,647, filed May 1, 1929. Application for reissue filed June 20, 1931. Serial No. 545,795.

My invention relates to improvement in toy for the amusement of children and grownup individuals. One of its objects is to provide a doll or image adapted to withstand rough usage and of attractive and amusing appearance. Another object is to provide a toy adapted to be readily kept in repair or operative condition. Another object is to provide an image having movement of its features tending to attract attention and amuse. My invention also comprises certain details of form and arrangement, and combination of components, all of which will be fully set forth in the description of the accompanying drawings in which:

Fig. 1 is a front elevation of my improved toy, in its normal position.

Fig. 2 is a view similar to Fig. 1 of the upper portion thereof, illustrating another position or appearance of the toy.

Fig. 3 is a perspective view of a flexible rubber sack employed in the interior of the toy to partially inflate the same.

The accompanying drawings illustrate one embodiment of my invention, in which 15 represents the body or casing of the toy or image comprising a front and a back of strong paper or textile material, for instance a leather, a leatherette or enameled textile material, cut to the outline of a doll or any other desired image having a body and head. The front is provided with eye holes 16, a hole 17 to represent the nose, and a hole or slit 18 to represent the mouth, and preferably projecting ears 19. The body of the toy is preferably of considerable width as compared with its length so as to form a body equal to or larger than the head.

The front and back sections are superimposed and secured together at their edges, preferably by running a line of stitches 20 or glue joint around the edge of the image.

A gas container or sack of flexible rubber 22, preferably of some bright and attractive color, and preferably but not necessarily having the neck portion 24 thereof of somewhat thicker material than the body portion 25 thereof, is next drawn over a lead-pencil or similar rod and then inserted through one of the eyes and down through the neck into the body.

The gas container after being introduced into the casing 15 is partially inflated so as to distend the body portion of the image and to only partially distend the middle vertical portion of the head section substantially as indicated in Fig. 1. The mouth of the sack is then closed by a cord, rubber band or other means, and thrust inside the head section.

The neck of the casing forms a restricted passage from the body section to the head section which normally tends to retain the major portion of the air in the sack in the lower or body portion of the casing, as indicated in Fig. 1. When in the normal condition shown in Fig. 1, the body portion of the casing which is comparatively inelastic is practically fully distended, and acts as an external sheath and support for the sack and tends to prevent this portion of the sack from becoming further distended to a point where it would be liable to burst. When pressure is applied by an operator to the exterior of the body portion of the casing, the body portion is reduced in capacity driving a portion of the gas contained in the sack through the restricted neck to distend the upper portion of the sack within the head to a greater or less degree, and thereby correspondingly distend the head portion of the casing. When pressure by the operator upon the body portion is released the gas in the sack returns from the head to the body portion of the sack, thereby returning to the normal position Fig. 1.

Distension of the head section of the rubber sack results first in a change in the color and appearance of the eyes, due to the distended upper portion of the sack, which is of a different color from that shown in the normal position, Fig. 1, appearing through the eye perforations. It should be noted that the ear members 19 of the head portion of the casing are provided with recesses 30, adapted to accommodate distended portions of the rubber sack caused by compression of the body portion of the casing. Thus, by compression of the body portion of the doll, or other image, the upper or head portion of the rubber sack will be distended, causing portions thereof adjacent the recesses 30 to become displaced therewithin. The recesses 30 are so shaped that upon compression of the body portion of the image the displaced parts of the rubber sack within the recesses 30 will move the ears 19 inwardly toward the head of the image. Therefore, if the body 15 is alternately compressed and released so as to produce a fluctuating pressure within the head, the ears 19 will be given an animated effect. Movement of the ears is also the natural result of distension of the head portion, which bulges rather freely, from front to rear, in the comparatively large space intermediate the ears and above the constricted neck portion, thereby forming wrinkles and tensioning of the material of the head portion, in the region of the ears, sufficient to induce ear movement upon alternate application and release of pressure on the body portion. Also pressure upon the body portion causes the mouth to open and the sack to protrude more or less therefrom. This opening of the mouth causes the head to nod forwardly and backwardly relative to the body section. Increased pressure also causes the sack to protrude to a greater or less degree at the eye holes, thereby producing convex eyes, and thereby changing the appearance of the head. It should be noted that the mouth opening is quite close to the constricted neck portion, and this accounts for the aforesaid nodding movement of the head when the device is actuated. It is readily obvious that a sort of hinge structure results, at the back of the neck or constricted area. The degree of nodding movement to be afforded the head portion thereby is seen to depend upon the proximity of the mouth slit, or opening 18, to the constricted neck portion. To some extent the amount of nodding movement depends upon the flexibility of the material of which the casing is made. The location of the mouth slit as shown in Fig. 1, is preferable for devices in which the casing is constructed of fairly flexible fabric, for in that event a sufficient hinge action is thereby secured to afford a very noticeable nodding movement of the head.

In the event of a gas container being perforated, a new gas container can readily be inserted in place thereof at a trifling expense. Also by inserting a new gas container of a different color, a material change in the appearance of the toy is effected. The aperture 18 simulating the mouth of the subject of the toy, may be varied as to size and shape. In the embodiment shown herein, the mouth opening is of a proper size to effect a bulging at the eye openings prior to bulging at the mouth opening, as hereinbefore set forth.

The article herein shown and described is capable of considerable modification within the scope of the claims without departing from the spirit of my invention.

What is claimed is:

1. A toy comprising a flexible hollow body having a hollow head member provided with ears, a collapsible inflatable container within said body and head member, said ears having recesses communicating with said head member, whereby compression of said hollow body will cause movement of said ears by distension of a portion of said collapsible container into said recesses.

2. An animated toy comprising a flexible hollow protective body and a flexible hollow normally flattened head member provided with ears, the head member being smaller than the body, a collapsible inflated fluid container disposed within said body and head member, means comprising a constricted connecting portion between the head and body through which extends a part of the collapsible container, the application of pressure on the body serving to displace the fluid for bulging the flexible normally flattened head member and thereby moving the ears relative thereto.

3. An animated toy comprising a flexible hollow protective body and a flexible hollow normally flattened head member provided with extensions and apertures simulating certain features of the subject of the toy and a constricted communicating portion connecting the body and head members, the head member being smaller than the body, a collapsible inflated fluid container disposed within said body and head member with a major portion of its length in the body portion to one side of the constricted portion whereby only the major portion of the fluid container is substantially inflated within the body, the application of pressure to the body thereby serving to displace some of the fluid into the smaller portion of the container for bulging the head member and moving the extensions, and for filling the apertures thereof.

4. An animated toy comprising a flexible hollow protective body and a hollow head member provided with apertures simulating certain features of the subject of the toy, and a constricted communicating portion connecting the body and head members, the head member being smaller than the body, a collapsible inflated fluid container disposed within said body and head member with a major portion of its length in the body portion to one side of the constricted portion whereby only the major portion of the fluid container is substantially inflated, within the body, the application of pressure to the body thereby serving to displace some of the fluid into the smaller portion of the container for substantially filling the head member and filling the apertures thereof.

5. An animated toy comprising an apertured protective casing providing a hollow head member and a flexible body member, the head member being smaller than the body, a constricted communicating portion connecting the body and head members, an aperture of the casing being located closely adjacent to the constricted communicating portion whereby to provide a hinge structure between the body member and the head member, a collapsible inflated fluid container disposed within said body member and head member with a major portion of its length in the larger of said members and to one side of the constricted portion whereby only the major portion of the fluid container is maintained substantially inflated within the casing, the application of pressure to the inflated part of the casing thereby serving to displace some of the fluid into the smaller portion of the container for extension thereof into the aperture whereby to actuate the hinge structure.

6. An animated toy comprising an apertured protective casing providing a plurality of hollow members one of which is flexible and larger than another, a constricted communicating portion connecting the hollow members, an aperture of the casing being located closely adjacent to the constricted portion whereby to provide a hinge structure connecting said members, a collapsible inflated fluid container disposed partly within one of the members and partly within another of the members so that when squeezed in the region of one of the said members the fluid displaced therefrom distends the other part of the fluid container to fill the aperture and actuate the hinge structure.

7. An animated toy comprising an apertured protective casing providing a plurality of hollow connected members one of which is flexible and larger than another, a constricted communicating portion connecting the hollow members, the aperture of the casing being in the smaller of the hollow members, a collapsible fluid container disposed partly within both hollow members so that when the flexible member is squeezed some of the fluid is displaced for distending a remote portion of the fluid container in the region of the aperture and causing it to protrude through the aperture.

8. An animated toy comprising an apertured protective casing providing a plurality of hollow connected members one of which is flexible and larger than another, the aperture of the casing being in the smaller of the hollow members, a collapsible fluid container disposed partly within both hollow members so that when the flexible member is squeezed some of the fluid is displaced for distending a remote portion of the fluid container in the region of the aperture and causing it to protrude through the aperture.

9. An animated toy comprising an apertured protective casing providing a plurality of hollow connected members one of which is flexible and larger than another, the apertures of the casing being of different sizes and located in the smaller of the hollow members, a collapsible fluid container disposed partly within both hollow members so that when the flexible member is squeezed some of the fluid is displaced for distending a remote portion of the fluid container in the region of the apertures and causing it to protrude successively through the apertures.

Signed at Cincinnati, Ohio, this 19th day of June, 1931.

WALTER J. GALLAGHER.